UNITED STATES PATENT OFFICE.

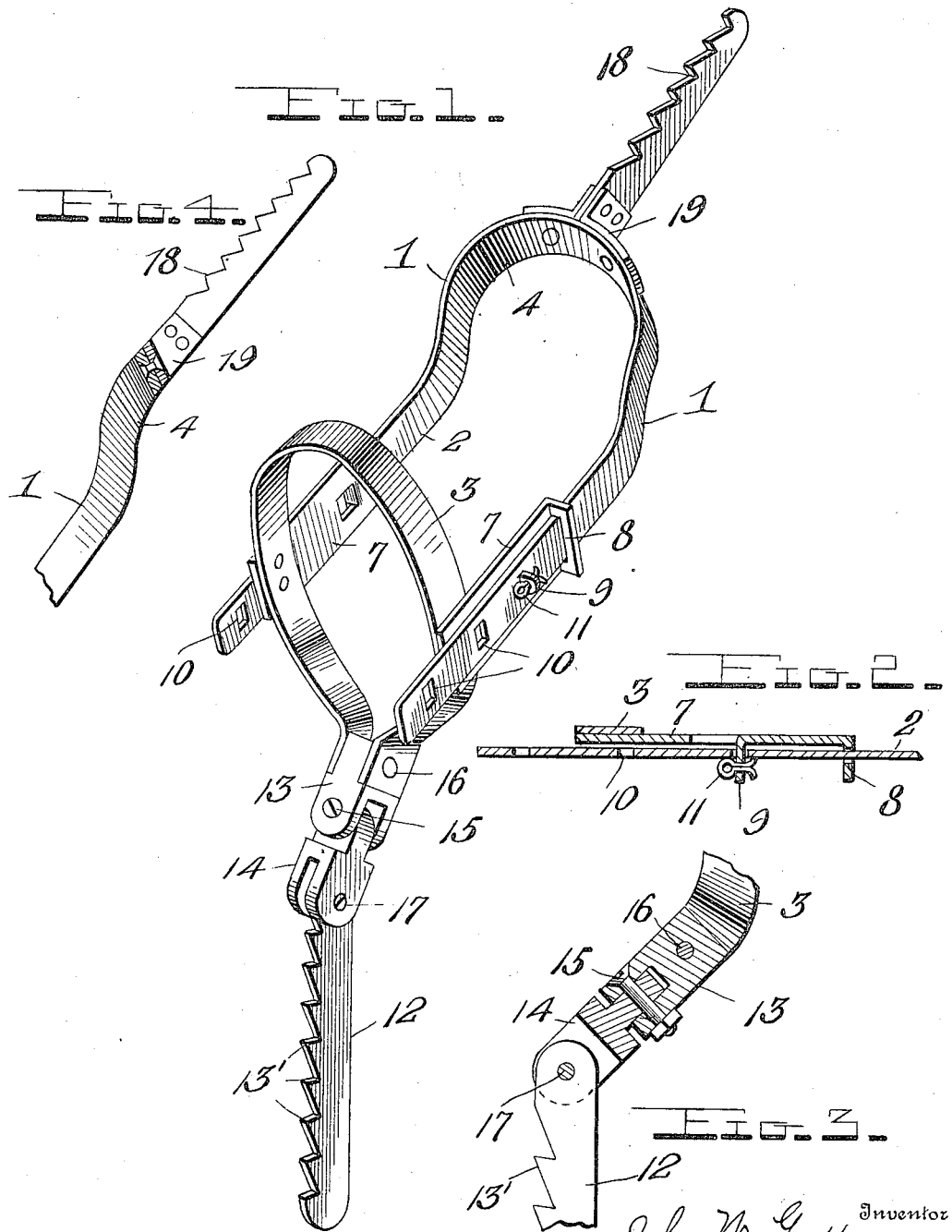

JOHN W. GUFFIN, OF DUKE, OKLAHOMA.

ANIMAL-POKE.

962,507.  Specification of Letters Patent. Patented June 28, 1910.

Application filed July 31, 1909. Serial No. 510,609.

*To all whom it may concern:*

Be it known that I, JOHN W. GUFFIN, a citizen of the United States, residing at Duke, in the county of Jackson and State of Oklahoma, have invented certain new and useful Improvements in Animal-Pokes, of which the following is a specification, reference being had to the accompanying drawings.

This invention relates to improvements in animal pokes.

The object of the invention is to provide a device of this character which may be readily adjusted to fit large or small animals, which has an improved swiveled hook bar and which will be of such construction that it may be produced at a small cost and will be exceedingly strong and durable.

With the above and other objects in view, the invention consists of the novel features of construction and the combination and arrangement of parts hereinafter fully described and claimed, and illustrated in the accompanying drawings, in which—

Figure 1 is a perspective view of the improved poke; Fig. 2 is a detail section showing the adjustment of the head frame; Fig. 3 is a detail section through the swiveled joint for the lower hook bar, and Fig. 4 is a detail sectional view through the upper portion of the device taken on the plane of the upper hook arm or member.

The invention comprises a frame to receive the head of the animal and consisting of a substantially U-shaped member 1 which extends over the neck at the back of the head and has parallel arms 2 extending forwardly along the opposite sides of the head and face. Carried by the forward portions of the arms 2 is a loop 3 which extends around the intermediate portion of the head. The U-shaped frame member 2 is preferably made of metal and has its closed upper portion curved longitudinally and offset as shown at 4, so as to fit around the upper rear portion of the animal's head. The front head member or loop 3 is also preferably made of metal and it is preferably made longitudinally adjustable on the arms 2, as shown more clearly in Fig. 2 of the drawings. This adjustment is effected by providing on the side portions of the loop 3 rearwardly extending plates 7, the rear ends of which are bent outwardly at right angles and formed with guide openings 8 to receive the arms 2. The intermediate portions of the plates 7 have stamped outwardly from them apertured keeper lugs 9 which may be projected through any one of a longitudinal series of openings 10 formed in the arms 2. Split pins or other fastenings 11 may be inserted in the apertures of the lugs or ears 9 to retain the parts in adjusted position. It will be seen that by making the head frame or stall in this manner it may be readily adjusted to fit animals of different sizes.

12 denotes a depending hook member preferably in the form of a metal bar having its forward edge formed with a plurality of hook-shaped teeth 13′. This bar is hung from the lower offset portion of the loop or member 3 by a swiveled joint which will allow it to swing laterally in any direction and to always hang in a perpendicular position. The swiveled point or connection consists of two parts 13, 14, each of which has a reduced end and an enlarged bifurcated end. The reduced end of the front part 14 is arranged in the bifurcated end of the rear part 13 and pivotally mounted by a vertical pivot 15 here shown in the form of a bolt. The reduced end of the rear part 13 is arranged between the forwardly bent ends of the metal strap forming the loop 3 and is secured between said ends, which latter are downturned, by a transverse bolt, rivet or similar fastening 16. The upper end of the hook bar 12 is arranged in the enlarged forked or bifurcated end of the front member 14 and hangs from a horizontal pivot bolt 17. Owing to this connection, it will be seen that when the animal throws its head to either side the hook bar 12 will swing in the same direction and will always hang in a perpendicular position. A similar hook bar 18 projects upwardly from the closed upper end of the U-shaped member 2, said bar 18 being attached to said member by two angle straps or plates 19, as clearly shown in Fig. 1. This connection, it will be noted, is exceedingly simple and securely attaches the upper hook member or bar to the head frame.

The use, operation and advantages of the invention will be readily understood from the foregoing detail description and further explanation is, therefore, thought to be unnecessary.

Having thus described the invention what is claimed is:

1. An animal poke comprising a frame having spaced side arms, the forward portions of said arms being formed with a longitudinal series of openings, a front loop, plates projecting rearwardly from said loop, guides on said plates to receive said arms, apertured lugs on said plates to enter the openings in said arms, removable pins arranged in the apertures of said lugs, and a hook member depending from said loop.

2. An animal poke comprising a frame having a U-shaped member constructed of rigid material and provided with forwardly and downwardly projecting parallel arms, the curved portion of said member being laterally offset to extend around the upper rear portion of the animal's head, a hook member extending upwardly from the curved upper portion of said U-shaped member, a front loop formed from a single piece of rigid material by bending the same upon itself, an adjustable connection between the side portions of said loop and the parallel arms of the U-shaped member, whereby said loop may be adjusted longitudinally of said arms, a depending hook member, and a swiveled connection for the latter secured between the spaced ends of said loop.

In testimony whereof I hereunto affix my signature in the presence of two witnesses.

JOHN W. GUFFIN.

Witnesses:
   C. PRESLEY,
   JOHN HEIDENREICH.